Patented Nov. 18, 1947

2,431,127

UNITED STATES PATENT OFFICE 2,431,127

PROCESS OF TREATING CASHEW NUT SHELL LIQUID

Roland E. Kremers, Summit, N. J., assignor to General Foods Corporation, Hoboken, N. J., a corporation of Delaware No Drawing. Application April 29, 1944, Serial No. 533,409

11 Claims. (Cl. 260—521)

This invention relates to a process of separating the acid constituent from cashew nut shell liquid or hydrogenated cashew nut shell liquid. This application is a continuation-in-part of my copending application Serial Number 441,758, filed May 4, 1942 (now Patent No. 2,380,319).

The principal object of the present invention is to provide a process by which the acid constituent may be easily and economically separated from cashew nut shell liquid or hydrogenated cashew nut shell liquid, which process possesses none of the disadvantages of the prior processes and provides a much sharper separation of the acid from the toxic phenolic constituents of the liquid than has heretofore been obtainable.

Other objects will be apparent from a consideration of the specification and the claims.

While cashew nut shell liquids of commerce have been used or suggested for use for various purposes, as for example in the manufacture of printing inks, varnishes, synthetic resins, molding compositions, and the like, anacardic acid and its derivatives have recently been suggested for the same purposes and also as ingredients of oil sprays, oil dips, insecticides, dyestuff and pharmaceutical intermediates, etc. Tetrahydroanacardic acid has also been suggested as an ingredient of insecticides, dyestuff and pharmaceutical intermediates and the like.

Heretofore, as far as I am aware, anacardic acid has been produced from cashew nut shell liquid by either one of two methods. In one method, cashew nut shell liquid is treated with a basic lead compound whereupon the anacardic acid precipitates as crude lead anacardate. This precipitate is separated by any suitable means such as filtering, centrifuging, etc., and, following separation, it is converted into crude anacardic acid by treating with acid. In the other method (see Balvalli, U. S. Patent No. 2,230,995), cashew nut shell liquid is treated with a basic sodium, or other alkali, compound whereupon a gel composed of sodium anacardate and the non-acidic portion of the liquid is formed. The gel is leached with a suitable solvent to dissolve and remove the greater proportion of the non-acidic material from the sodium anacardate, and, following leaching, the crude sodium anacardate is converted into crude anacardic acid by treatment with acid.

These procedures for the production of anacardic acid, however, leave much to be desired. The anacardol and other phenolic materials of the non-acidic portion of the liquid react to a considerable extent with basic lead compounds and the insoluble compounds formed precipitate conjointly with the anacardate. Consequently, when the anacardic acid is regenerated it is contaminated with considerable phenolic impurities. In fact, some of the phenolic constituents react so readily with the basic lead compounds that reprecipitation of the anacardic acid is only moderately effective for their removal. Reaction of cashew nut shell liquid with a basic sodium, or other alkali, compound is equally unselective and yields a gel, rather than a precipitate. This necessitates a tedious liquid-liquid extraction of the aqueous phase with a suitable immiscible solvent such as hexane, benzene, petroleum ether, and the like. By such a process, only low yields of reasonably pure anacardic acid are obtainable and if high yields of anacardic acid are desired, the purity of the product is necessarily low. Thus, in order to prepare reasonably pure anacardic acid through the formation of either the basic lead or sodium anacardates, the procedures of purification are so involved as to render such preparation practical only in the laboratory.

The production of tetrahydroanacardic acid is similarly complicated, whether the procedure used involves hydrogenation of cashew nut shell liquid followed by treatment with lead or sodium compounds, or treatment of the cashew nut shell liquid with lead or sodium compounds followed by hydrogenation of the crude anacardic acid. Purification is somewhat simpler in the case of the tetrahydroanacardic acid, however, since it crystallizes more readily due to its higher melting point, as compared with anacardic acid. Nevertheless, the proportion of non-acidic impurities which contaminates the tetrahydroanacardic acid obtained by treatment with lead or sodium compounds is comparable to that encountered in the production of anacardic acid by the same methods.

Cashew nut shell liquid, as it exists in the nut shells, contains a large proportion of anacardic acid and a small proportion of non-acidic material known generally as the cardolic fraction. The non-acidic portion of the liquid includes various phenols, one of which is anacardol. While anacardol is probably present to some extent in the liquid naturally occurring in the nut shells, it owes its presence in the commercial liquids largely to its formation from anacardic acid. Thus in the older methods of extraction which rely on heat to destroy the cellular structure of the shells, a large proportion of the anacardic acid, originally contained in the shells, is converted to anacardol. On the other hand, the liquids obtained by modern methods depending on pressure, or cold-pressing of the shells, contain large amounts of anacardic acid in proportion to the amount of anacardol, and, therefore, whereas the anacardic acid content of heat-extracted liquids is not generally greater than 16%, the liquids obtained by pressure extraction are known to contain up to 70% of anacardic acid.

The starting material in the process of the present invention may be cashew nut shell liquid obtained by either of the above-described methods of extraction or, in fact, by any other method, such as solvent extraction of the shells, provided that an appreciable amount of anacardic acid is contained therein, or it may be any hydrogenated cashew nut shell liquid containing an appreciable amount of tetrahydroanacardic acid, i. e., anacardic acid having its aliphatic side chain hydrogenated. Hence, the invention can be applied to cashew nut shell liquids or hydrogenated cashew nut shell liquids, whether high or low in acid content, for the production of anacardic acid or tetrahydroanacardic acid, although the process is particularly applicable for the treatment of liquids having a relatively high content of anacardic acid or tetrahydroanacardic acid, that is an acid content of at least 40%. It is to be further understood that the invention is applicable for the treatment of any fraction of the cashew liquid containing anacardic acid, or of any hydrogenated fraction of the liquid or fraction of hydrogenated cashew liquid containing tetrahydroanacardic acid. Furthermore, the process may be employed in the separation of the acid constituent from cashew nut shell liquid or hydrogenated cashew nut shell liquid or a fraction thereof which has been partially carboxylated, for example, by a method analogous to the Kolbe method employed in the production of salicylic acid from phenol. All of the aforementioned various liquids are included in the phrase, "a liquid selected from the group consisting of cashew nut shell liquid and hydrogenated cashew nut shell liquid."

For convenience, the invention is hereinafter defined, and its procedures described, largely in connection with the production of anacardic acid from cashew nut shell liquid. It is understood, however, that the procedures described are equally applicable to the production of tetrahydroanacardic acid from hydrogenated cashew nut shell liquid, and to the separation of the acid constituent from a carboxylated cashew nut shell liquid.

The invention comprises reacting the acid in cashew nut shell liquid or hydrogenated cashew nut shell liquid with alkaline earth metal ions to form the alkaline earth metal salt, separating the salt from toxic phenolic constituents associated therewith, regenerating the organic acid from the separated salt by an acid capable of displacing the organic acid from the salt, and separating the organic acid liberated from the salt from the reaction mixture. As I have found, the phenolic materials of the non-acidic portion of the liquid react to only a slight extent with alkaline earth metal ions and consequently a much sharper separation of acid contained in the liquid treated from the phenolic materials is obtained than has been possible by previously known processes. An acid of a high degree of purity may, therefore, be obtained by relatively simple procedures of purification.

A practical process for the production of anacardic acid or tetrahydroanacardic acid of a high degree of purity is of particular utility. It has long been apparent that the dermatitis produced in individuals by cashew nut shell liquid has been the primary obstacle to the wider use of the liquid. In studying a related problem, Majima (Ber. 42, 1418 (1909)) showed that urushiol, a homologue of catechol, is the toxic constituent of Japanese lac. Since the time of Majima's publication, it has been believed that the toxicity of cashew nut shell liquid was likewise due to the presence of urushiol, or some homologous or otherwise similar compound. In accordance with this belief, attempts to detoxify cashew nut shell liquid have been directed to the destruction or inactivation of the urushiol, as, for example, by reacting with proteins or analogous materials (see Cayo, U. S. Nos. 2,183,957 and 2,183,958), but no certain method has been devised for providing non-toxic cashew materials which are safe to handle. I have discovered, however, that anacardol is highly toxic and, in view of the recognized toxicity of the urushiol type compounds and the discovered toxicity of anacardol, it is quite possible that all of the phenolic constituents of cashew nut shell liquid are toxic. I have also found that, while anacardol is toxic, anacardic acid is non-toxic. In the light of these discoveries, it will be apparent that, by producing anacardic acid or tetrahydroanacardic acid free from phenolic impurities, I have provided cashew materials that are non-toxic and safe to handle.

The alkaline earth metal ions which are employed in the process of the invention are those of calcium, barium, and strontium. It is to be understood that magnesium ions are not included within the term "alkaline earth metal ions," although as hereinafter pointed out a relatively small amount of magnesium ions may be present with the calcium or other alkaline earth ions. In the practice of the invention, the basic compounds, such as the oxide or hydroxide, of the alkaline earth metals can be employed. The water-soluble neutral salts of the alkaline earth metals, such as the chlorides, nitrates, and the like, can also be employed, but since these do not react directly with anacardic acid, the cashew liquid in this case is first treated with a basic compound, as, for example, an aqueous solution of sodium or potassium hydroxide, to form a water-soluble anacardate which reacts readily with the neutral salts to precipitate the alkaline earth metal anacardate. If desired, the cashew nut shell liquid can be treated first with the neutral salt and then with the basic compound, or the neutral salt and the basic compound can be mixed together and the cashew nut shell liquid treated directly with this mixture. The claims which state that alkaline earth metal ions are reacted with ions of the acid of the liquid to form the alkaline earth metal salt of the acid includes both the direct reaction of the oxide or hydroxide with the acid and the reaction of a soluble salt of the acid with an alkaline earth metal salt.

Of the alkaline earth metal compounds available for use, the oxides or hydroxides are generally preferred, and due to the availability of slaked and unslaked lime, these compounds may advantageously be employed. The alkaline earth metal oxides and hydroxides are included herein in the term "basic alkaline earth metal compound." It has been found that the lime used in the process should usually not contain a high percentage of magnesium oxide or hydroxide; for example, in most instances, the amount of magnesium associated with the lime will not exceed about 15%. In general, the lower the magnesia content of the lime, the better will be the separation of the anacardate from the phenolic constituents.

Anacardic and tetrahydroanacardic acids are represented by the following structural formulas:

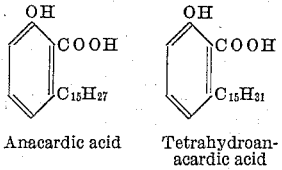

Anacardic acid    Tetrahydroan-
              acardic acid

Both acids are capable of forming a neutral salt and a basic salt with alkaline earth metal ions, as shown in the following formulas, using the calcium salts of anacardic acid as illustrative:

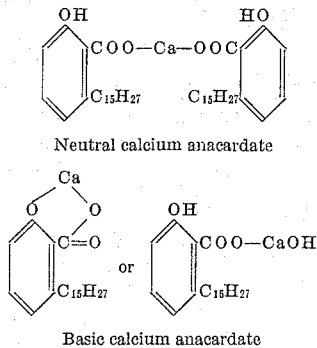

Neutral calcium anacardate

Basic calcium anacardate

The neutral salt is not completely insoluble in such solvents as acetone, ethanol, and isopropanol, whereas the basic salt is quite insoluble in such solvents. Hence, it is desirable to form the basic salt of the anacardic acid as such solvents are generally employed to effect the solution of the unreacted material. As will be observed from the above formulas, the mol ratio of anacardic acid to alkaline earth metal ion is 2 to 1 in the case of the neutral salt and 1 to 1 in the case of the basic salt. Consequently, in order to form the basic salt, at least 1 mol of alkaline earth metal compound is reacted with each mol of anacardic acid contained in the cashew nut shell liquid. However, in order to insure complete conversion of the anacardic acid to the basic salt, it is desirable to use the alkaline earth metal compound in excess of 1 mol. For example, in the case of cashew nut shell liquid containing 65% of anacardic acid by weight, satisfactory results will be obtained by employing slaked lime in the range from about 14% to 25% based on the weight of the liquid, the use of approximately 17% of unslaked lime being usually preferred. It will be understood that equivalent amounts of other materials furnishing alkaline earth metal ions may be used and that the amount employed will be dependent upon the anacardic acid content of the liquid. In fact, as stated, the amount of alkaline earth compound may be varied widely; for example, when the efficiency of the process is not important, the amount of alkaline earth ions available for reaction may be insufficient to form the basic salt and may only be sufficient to convert a portion of the acid into the neutral salt. On the other hand, an excess over that required to convert all of the acid into the basic salt is not deleterious except that its use represents a loss of material.

The cashew nut shell liquid can be treated with the alkaline earth metal compound in any desired manner. When an alkaline earth metal oxide or hydroxide is used, the treatment can be effected without appreciably diluting either reactant (by solution or dispersion in suitable media) to obtain the hardened plastic product of my copending application Serial No. 441,758, filed May 4, 1942. For example, the liquid per se or emulsified with a small amount of water can be treated with the alkaline earth metal oxide or hydroxide in the dry state to obtain the above mentioned hardened plastic product. As stated in the copending application, the hardened plastic product will be obtained when the amount of alkaline earth metal oxide or hydroxide is employed in an amount in excess of that theoretically required to form a neutral alkaline earth metal salt of the anacardic acid content of the cashew nut shell liquid. It is preferable, however, to effect the treatment of the cashew nut shell liquid so that appreciable dilution of either, or both, of the reactants is provided in order to obtain a finely divided precipitate of alkaline earth metal anacardate. Suitable media for the solution or dispersion of the cashew nut shell liquid are acetone, isopropyl alcohol, aqueous sodium hydroxide, and the like. The cashew nut shell liquid thus dissolved or dispersed can be treated with the alkaline earth metal compound dissolved or dispersed in suitable media such as water, isopropyl alcohol, or the like. In case the alkaline earth metal ions are to be provided by an alkaline earth metal salt, the cashew nut shell liquid may be mixed with a solution of a basic compound, such as sodium or potassium hydroxide, and advantageously a relatively large volume of water is used. After the formation of the soluble salt of anacardic acid, the alkaline earth salt is added, either as a solid or in solution, preferably the latter. The mixture is agitated and the alkaline earth metal anacardate forms as a precipitate. As stated above, the basic compound and the alkaline earth metal salt may be dissolved in water and the solution added to the cashew nut shell liquid, or the solution of the alkaline earth metal salt may first be added to the cashew nut shell liquid followed by the addition of the solution of the basic compound.

Separation of the alkaline earth metal anacardate formed by the reaction can be accomplished by any suitable means. Where the aforementioned hardened plastic product is obtained, all of the non-acidic portion of the cashew nut shell liquid is contained therein and subdivision of the plastic product, followed by leaching with a suitable solvent for the non-acidic portion of the liquid, as, for example, acetone, isopropyl alcohol or aqueous sodium hydroxide, will effect separation of the anacardate. The leaching can be effected by any technique which provides for contact between the solvent and the alkaline earth metal anacardate, withdrawal of the spent solvent, and replenishment with fresh solvent. Obviously, the leaching can be continued until the anacardate is substantially free of surface-held impurities. Where the finely divided precipitate of alkaline earth metal anacardate is obtained, the separation is readily effected by filtration, decantation, or centrifugation, and the anacardate is easily washed free from surface-held impurities with a suitable solvent. Whether the hardened plastic form or the finely divided precipitate of the alkaline earth metal anacardate is obtained, impurities will be occluded in the anacardate. It is believed that the greater proportion of these impurities are present in an uncombined state, although some proportion is undoubtedly combined with the alkaline earth metal ion. It will thus be appreciated that precipitation of the alkaline earth metal anacardate in finely divided form is of advantage in that it minimizes occlusion of impurities. Where the hardened plastic reaction product is obtained, it will generally be found impracticable to subdivide it, in the first instance, to a degree of fineness comparable to that of the aforementioned finely divided precipitate of anacardate. However, after carrying out the aforementioned leaching of the subdivided plastic product, the anacardate is sufficiently hard to permit grinding to a more finely divided state thereby exposing an additional amount of impurities, which can be removed by further leaching.

Regeneration of anacardic acid from the separated alkaline earth metal anacardate can be accomplished by treating the anacardate with any acid which is capable of displacing the anacardic acid from the salt, namely, one which is stronger than anacardic acid (as measured by its dissociation constant) or one which forms a salt with the alkaline earth metal more insoluble than the alkaline earth metal anacardate (as measured by its solubility product). Suitable acids are mineral acids such as sulphuric, phosphoric, hydrochloric, etc., and organic acids such as citric, tartaric, oxalic, etc. For manipulative reasons, the use of an acid which forms an insoluble alkaline earth metal compound is preferred. The amount of acid employed is advantageously sufficient to liberate all of the anacardic acid from the alkaline earth metal salt, and generally, the acids are used in dilute solution, as, for example, in concentrations of about 5% to 10%, although, with the exception of polymerizing acids such as sulphuric, it is possible to employ them in any concentration desired. In case sulphuric acid is employed, the concentration of the acid and the conditions of the treatment are selected so that appreciable polymerization will be avoided.

With aqueous media at room temperature, the regeneration reaction proceeds rapidly at the surface of the metallic anacardate, but the regenerated anacardic acid tends to form a coating over the metallic anacardate which prevents further progress of the reaction. This can be overcome by raising the temperature of the mixture, for example, to about 50° C. to 70° C., and agitating vigorously to break the anacardic acid film, or by adding to the mixture a solvent for anacardic acid. This solvent may be a water-immiscible solvent such as hexane, benzene, carbon tetrachloride, chloroform, and the like, or a water-miscible solvent such as isopropyl alcohol, acetone, and the like. The first procedure, namely, the one employing vigorous agitation at slightly elevated temperatures, exposes the unreacted anacardate by emulsifying the regenerated anacardic acid, whereas the second procedure, namely, the one which employs a solvent, exposes the unreacted anacardate by dissolving away the regenerated anacardic acid. Whereas the use of a solvent for anacardic acid permits a rapid rate of reaction at room temperature, higher temperatures can be employed for the purpose of increasing the rate of reaction. Regardless of which of the procedures is used, however, the temperature employed should be below about 100° C. in order to avoid decarboxylation of the regenerated anacardic acid.

Following regeneration, the anacardic acid can be recovered from the reaction mixture by relatively simple procedures, which will vary depending on whether water and/or a solvent for anacardic acid has been employed and whether the solvent is water-miscible or water-immiscible. Where a solvent has not been employed, the regenerated anacardic acid separates from the reaction mixture as a supernatant oil, which can be removed by simple decantation. If the regeneration has been carried out in the presence of a water-immiscible solvent, the solvent phase can be separated from the reaction mixture, as by decantation, and the solvent evaporated for the recovery of the dissolved anacardic acid. Where a water-miscible solvent has been employed, the reaction mixture can be filtered to remove the solid residue, the filtrate evaporated, and the residual anacardic acid recovered, or, preferably, the reaction mixture can be extracted with a water-immiscible solvent for anacardic acid and the anacardic acid thereafter recovered by evaporation of the solvent.

Using the procedures of my invention, I can obtain crude anacardic acid of 90–93% acid content upon regeneration of the alkaline earth metal anacardate, and upon further purification, as by treatment with charcoal, recrystallization, or other known procedures, the acid content can be increased to 96–99%.

While the alkaline earth metal anacardates directly produced from cashew nut shell liquid after removal of the surface-held impurities are contaminated to some extent by toxic non-acidic impurities, these impurities are confined to the interior of the solid particles. Absorption of the solid anacardates through the pores of the skin is negligible, and hence the toxic contaminants are rendered ineffective. This is similarly true of the non-toxic solidified plastic product described in my aforementioned copending application, Serial No. 441,758. On the other hand, regeneration of the liquid anacardic acid from the anacardate liberates the toxic non-acidic impurities and renders the crude anacardic acid somewhat toxic. The proportion of the toxic contaminants, however, is small, and, as above stated, is easily removed from the anacardic acid by simple means of purification. Thus, the contaminants can be removed by treatment of a dilute solution of the crude acid, for example a hexane solution, with charcoal; by crystallization of the acid from such solvents as hexane, petroleum ether, and the like, at temperatures of —20° C. to —40° C.; or by the conversion of the anacardic acid into an alkali metal salt and the liquid-liquid extraction of the aqueous solution thereof with a suitable solvent such as hexane, benzene, and the like, and the regeneration of the anacardic acid by treatment with acid. Also, the toxic substances can be removed from the crude anacardic acid by storage in kerosene, whereupon the toxic substances gradually precipitate as a dark-colored gum, which can be readily separated by decantation. In the case of tetrahydroanacardic acid, prepared from hydrogenated cashew nut shell liquid, or by hydrogenation of the crude regenerated anacardic acid, an additional operative method of purification comprises the formation of an alkali metal salt, such as that of sodium or potassium, and crystallization of the salt from water, followed by regeneration with mineral acid.

The following specific examples will serve to illustrate and explain the present invention.

EXAMPLE 1

*Preparation of calcium anacardate*

500 grams of cashew nut shell liquid, containing 63.5% of anacardic acid, which had been centrifuged to remove solid impurities, were dissolved in 2 litres of isopropyl alcohol. The solution was clarified by filtration with filter-cel, which was added to the solution and also made up into a mat on a Buchner funnel.

100 grams of slaked lime were weighed out and triturated to a thin paste with a sufficient quantity of water added in small portions.

The lime paste was transferred to a five-litre round bottom flask fitted with a mechanical stirrer, and was suspended by agitation in 1 litre of isopropyl alcohol. To this suspension, the filtered solution of cashew nut shell liquid was added in a small stream from a separatory funnel. The mixture was then stirred continuously until the reaction between the lime and the cashew liquid appeared to be complete. This was indicated by reduction in the color of the solution to a very light shade of brown, and by the formation of a rather voluminous light-red colored, finely divided precipitate of the anacardate. The time required for this reaction has varied from one hour and forty minutes to twenty-four hours and it appears to depend to a considerable extent upon the amount of water present in the solution. The reaction is very slow in a dry solvent, but can be accelerated by heating the mixture over a water-bath, using a reflux condenser to minimize solvent loss.

At the completion of the above described reaction, the mixture was filtered by suction and the precipitate washed with fresh solvent. The precipitate was pressed and sucked as dry as possible after which it was spread on paper to air-dry. The yield of solvent-free salt was approximately 400 grams of calcium anacardate.

EXAMPLE 2

*Regeneration of anacardic acid*

400 grams of air-dried calcium salt, prepared as described above in Example 1, were suspended with mechanical stirring in 3,000 cc. of hexane. A quantity of sulphuric acid calculated to be more than equivalent to the calcium present in the salt, as determined by ash analysis (in one instance, this equaled 90 cc. $H_2SO_4$, sp. gr. 1.84), was diluted with eight parts of water. The diluted sulphuric acid was added slowly but continuously from a separatory funnel to the suspension of the calcium anacardate in hexane. The stirring was continued for one hour after the addition of the last of the sulphuric acid. The precipitated calcium sulphate thus formed was collected by filtration with a Buchner funnel. The filter cake was then washed several times with hexane, the washings being combined with the first filtrate. The hexane layer of the filtrate was separated in a large separatory funnel and was washed several times with water until the wash water was neutral to litmus. Care was taken to shake the hexane-water mixture gently in order to avoid the formation of emulsions which are sometimes difficult to break.

The washed hexane solution was heated to boiling in a flask provided with a vertical condenser and an automatic separator of the Bidwell-Stirling type, whereby the water was removed from the system and the hexane was returned to the flask. This operation was continued until the hexane solution of anacardic acid was free of water. The anacardic acid was recovered by distillation of the hexane under somewhat reduced pressure, and an air stream was bubbled through the anacardic acid residue to remove the last traces of solvent.

EXAMPLE 3

*Preparation of calcium anacardate*

10 grams of cashew nut shell liquid, containing 63.5% of anacardic acid, were dissolved in 640 cc. of 0.1 normal sodium hydroxide solution, and clarified by filtration after treatment with 0.5 gram of charcoal and 2 grams of filter-cel. The clear filtrate was heated on a water-bath to a temperature of about 80° C. and stirred mechanically. To this solution, 3.2 grams of calcium chloride ($CaCl_2 \cdot 2H_2O$) in 58 cc. of water were added. Heating to maintain the mixture at about 80° C. and stirring were continued for two and one-half hours. Thereafter, the mixture was allowed to stand overnight. The precipitate thus formed was compacted by centrifuging and the supernatant, turbid, aqueous layer was decanted. The precipitate was transferred to a Buchner funnel, washed with 0.05 normal sodium hydroxide solution by suction filtration, and finally air-dried. The yield was 7.3 grams of calcium anacardate. Anacardic acid can be regenerated from the calcium salt by the method described in Example 2 above, or in Examples 5 and 6 following.

EXAMPLE 4

*Preparation of calcium anacardate*

32 grams of water were added to 650 grams of cashew nut shell liquid containing about 55% of anacardic acid and the resulting mixture was heated to 60° C. and mixed vigorously to uniformly disperse the water throughout the liquid. 111 grams of slaked lime were added to this mixture and the mixing was continued for five minutes, during which time the temperature of the mixture rose to 90° C. Upon cooling to room temperature, the resulting solidified plastic product was comminuted and leached with successive portions of acetone until free from anacardol and other soluble constituents of the cashew liquid. The acetone-wet calcium anacardate was pressed and sucked as dry as possible, after which it was spread on paper to air-dry.

It will be noted that the cashew liquid-water mixture was heated to 60° C. This heating was employed for the purpose of reducing the viscosity of the cashew liquid. It has been found that at temperatures below about 50° C. the greater viscosity of the liquid inhibits the dispersion of the lime and the reaction between the anacardic acid and the lime thus tends to be slow and occasionally incomplete.

EXAMPLE 5

*Regeneration of anacardic acid*

The air-dried calcium salt, prepared as described above in Example 4, was treated with a solution of 205 grams of oxalic acid in one litre of acetone. The mixture was stirred for one hour while its temperature was maintained at a point just below boiling. Following the stirring and heating, the solution was filtered to remove the precipitated calcium oxalate and the filtered precipitate was washed with two portions of 200 cc. each of acetone. The filtrate and washings were combined and concentrated by distillation, the final traces of acetone being removed under reduced pressure. The small amount of oxalic acid which crystallized from the anacardic acid upon cooling to room temperature was removed by filtration. The yield of anacardic acid was 317 grams, 74% of theory. Most probably, the major portion of the loss was caused by incomplete extraction of the anacardic acid from the precipitated calcium oxalate.

EXAMPLE 6

*Regeneration of anacardic acid*

1,000 grams of calcium anacardate, prepared as described in either Example 1, 3, or 4 above, were suspended in 1500 cc. of hexane. Slowly and with vigorous stirring, 742 cc. of concentrated hydrochloric acid were added to this suspension. The mixture became hot as the acid was added and gas was evolved ($CO_2$ from the $CaCO_3$ present). With the exception of a small amount of solid impurities, the mixture gradually dissolved to form a dark colored oil. The mixture was allowed to stand overnight whereupon it separated into two layers, namely, an upper layer of hexane and an almost solid lower layer. The hexane layer was decanted and a litre of hexane and a litre of water added to the lower layer. The mixture formed a gelatinous emulsion which was broken somewhat by heating on a steam bath. After several hours' standing, a part of the upper hexane layer could be decanted. The emulsion was extracted twice more with one-litre portion of hexane and the decanted hexane combined with the two portions of decanted hexane previously obtained. The combined hexane extracts were concentrated slightly by evaporation and then refluxed to remove water, using the Bidwell-Stirling type of separator, after which they were evaporated to recover the dissolved anacardic acid. The resulting anacardic acid was dark in color, crystallized rapidly when cooled to below room temperature, and remained semi-solid at room temperature. The yield of anacardic acid was 516 grams.

EXAMPLE 7

*Hydrogenation of anacardic acid*

A one-litre flask was charged with 100 grams of anacardic acid (M. P. 20° C.), 500 cc. of 95% ethanol, and 0.5 gram of platinum oxide catalyst. The anacardic acid had been obtained as described in either Example 2, 5, or 6 and subsequently purified by treatment with charcoal. The flask was shaken with hydrogen for one hour. The heat of reaction warmed the mixture to about 40° C. The hydrogen absorbed amounted to 142 cc. (25° C.) per gram of anacardic acid, i. e., 1.97 mols of hydrogen per mol of acid.

After hydrogenation was completed, the solution was filtered to remove the platinum oxide catalyst and treated with 300 cc. of water, which precipitated the tetrahydroanacardic acid. After filtering and drying, this material amounted to 97 grams, melted at about 90° C., and was light brown in color. This color was removed by dissolving the product in one litre of water, at 70° C.–80° C., containing sufficient sodium hydroxide to effect a final pH of 9–11. The solution was clarified by filtration, and cooled to about 0° C. whereupon the sodium tetrahydroanacardate precipitated. The sodium salt was filtered and washed with a little cold water. One more recrystallization of the sodium salt resulted in a pure white product, which was converted to tetrahydroanacardic acid by pouring its solution into excess dilute hydrochloric acid. The precipitated acid, after filtering and drying amounted to 87 grams and melted at 90° C.–92° C.

EXAMPLE 8

*Preparation of tetrahydroanacardic acid from cashew nut shell liquid*

600 grams of cashew nut shell liquid containing 54.2% or anacardic acid were stirred for 0.5 hour with 23 grams of oxalic acid dissolved in 0.5 litre of acetone in order to precipitate any calcium ion which may have been present as an ash constituent in the liquid. The mixture was filtered and the acetone removed by distillation. The cashew liquid was then washed with water to remove residual oxalic acid, the emulsions which formed in the later washings being broken by the addition of about 0.5 litre of hexane. The washing with water was continued until the water solution was neutral to litmus, after which the hexane was removed from the liquid by distillation. The purpose of the above described acid treatment was to remove ash, such as CaO, etc., from the cashew nut shell liquid, thus preventing possible poisoning of the hydrogenation catalyst and decarboxylation during hydrogenation.

403.8 grams of the cashew liquid treated as described above were hydrogenated for seven hours at 1,000 to 2,000 pounds per square inch pressure and at a temperature of 60° C. to 80° C., using one teaspoonful of Raney nickel as a hydrogenating catalyst. Titration of the hydrogenated oil showed a tetrahydroanacardic acid content of 58.4 per cent.

250 grams of the hydrogenated cashew liquid were melted in a Monel mixing pot at amout 65° C. and 12.5 cc. of water were added. 50 grams of lime were added to the mixture and stirred in thoroughly. The temperature rose from 65° C. to 85° C. The product solidified after two hours' standing.

The lime treated solid product was divided into five portions, each of which was placed in a Soxhlet extractor and extracted with acetone for five hours to remove the non-acidic portion of the liquid from the calcium tetrahydroanacardate. Distillation of the acetone from the extract left a residue of the non-acidic portion of the liquid amounting to 88.5 grams (85 per cent. of theory). The calcium tetrahydroanacardate was converted to the free acid by adding, a few hundred cc. at a time, a solution of 85 grams of oxalic acid in 2 litres of acetone. After stirring for about thirty minutes, the calcium oxalate was removed by filtration an washed with acetone. The acetone washings were added to the filtrate and the whole evaporated to dryness. The residue was stirred with hot water to remove any remaining oxalic acid. The resulting washed crude tetrahydroanacardic acid was, by titration, 87.4 per cent. pure and amounted to 93.7 per cent. of theory, based upon the titres of the original cashew liquid and the final product. If desired, the acid could have been purified through the crystallization of its sodium salt as shown in Example 7.

EXAMPLE 9

*Purification of anacardic acid*

Crude anacardic acid (88%–90%) acid was dissolved in petroleum ether using 2.0 to 2.5 grams of acid per 100 cc. of solvent. The solution was allowed to stand for a short time and then filtered to remove any insoluble material which might have been present. Darco KB charcoal was added to the filtered solution in an amount equal to 30% to 50%, by weight, of the acid being treated. The mixture was shaken thoroughly and allowed to stand overnight, after which the charcoal was filtered out. A fresh portion of charcoal was added, the mixture again allowed to stand overnight, and the charcoal filtered out. The resulting solution of the acid was almost colorless. The petroleum ether was distilled from the acid, reduced pressure being employed to remove the last traces of solvent. The residual anacardic acid was light yellow in color and titrated greater than 98% acid.

Example 10

*Recrystallization of anacardic acid at low temperatures*

A solution of 100 grams of anacardic acid (90.2% pure) in 2 litres of hexane was cooled from room temperature to −44° C. in one and one-half hours. After maintaining this temperature for one and one-half hours more, a solid began to separate from the solution. At the end of two and one-half hours at −40° C. the solution was filtered and the precipitate was washed with 500 cc. of hexane at −43° C. This treatment yielded 52 grams of 95.8% pure anacardic acid.

In a similar fashion, the filtrate and wash liquor were cooled to −60° C. and 35 grams of crystals of 89.5% purity were obtained. The remaining liquor contained 19 grams of anacardic acid of 79.6% purity.

Example 11

*Purification of anacardic acid*

Twenty grams of crude anacardic acid, 92.3% acid, were dissolved in 100 cc. i-propanol and 100 cc. of water containing sufficient sodium hydroxide to raise the pH to 9. This solution was extracted in a separatory funnel with four 100 cc. portions of benzene. The combined benzene extracts were washed with 50% i-propanol, then with a saturated solution of oxalic acid, and finally with water. After drying, distillation of the benzene left 2.20 grams dark oil which, by titration, was 1.14 grams anacardic acid and 1.06 grams non-acidic material indicating, by difference, an acid yield of 93.8% and an acid purity of 97.3%.

I claim:

1. The process for the separation of the acid constituent contained in a liquid selected from the group consisting of cashew nut shell liquid and hydrogenated cashew nut shell liquid from toxic phenolic components of said liquid which comprises reacting alkaline earth metal ions with ions of acid contained in said liquid to form a solid alkaline earth metal salt of said acid and water of reaction, with which toxic phenolic components of said liquid are associated, treating said mixture of solid salt, water of reaction, and toxic phenolic components with a water-miscible solvent in which said toxic phenolic components are soluble but in which said solid salt is substantially insoluble, to form a single liquid-phase comprising said toxic phenolic components, said water of reaction and said solvent, separating said liquid-phase from said solid salt, treating said separated salt with an acid capable of displacing the acid from said salt, and separating the liberated acid from the reaction mixture.

2. The process of claim 1 and wherein during the treatment of said separated salt with an acid capable of displacing the acid from said salt, the mixture of salt and acid is vigorously agitated and heated to a temperature between about 50° C. and 100° C.

3. The process of claim 2 and wherein the treatment of said separated salt with an acid capable of displacing the acid from said salt is conducted in the presence of a solvent for the liberated acid.

4. The process for the separation of the acid constituent contained in a liquid selected from the group consisting of cashew nut shell liquid and hydrogenated cashew nut shell liquid from toxic phenolic components of said liquid which comprises reacting a basic alkaline earth metal compound with acid contained in said liquid to form a solid alkaline earth metal salt of said acid and water of reaction, with which toxic phenolic components of said liquid are associated, said reaction being conducted in a water-miscible solvent in which said toxic phenolic components are soluble but in which said solid salt is substantially insoluble to form said solid alkaline earth metal salt as a finely divided precipitate in a single liquid-phase comprising said toxic phenolic components, said water of reaction and said solvent, separating said liquid-phase from said solid salt, treating said separated salt with an acid capable of displacing the acid from said salt, and separating the liberated acid from the reaction mixture.

5. The process of claim 4 wherein the alkaline earth metal compound is employed in excess of that theoretically required to react with the acid to form the basic salt of the acid.

6. The process of claim 4 wherein the liquid treated is a cashew nut shell liquid containing at least 40% of anacardic acid; wherein the alkaline earth metal compound is slaked lime and is employed in excess of that theoretically required to react with the acid to form the basic salt of the acid; and wherein the acid capable of displacing the acid from the alkaline earth metal salt is an acid which forms an insoluble salt with the alkaline earth metal.

7. The process for the separation of the acid constituent contained in a liquid selected from the group consisting of cashew nut shell liquid and hydrogenated cashew nut shell liquid containing at least 40% of said acid from toxic phenolic components of said liquid which comprises reacting a basic alkaline earth compound with acid contained in said liquid, to form a hardened plastic mass comprising the alkaline earth metal salt of said acid in solid form, water of reaction and said toxic phenolic components, the alkaline earth metal compound being used in excess of that theoretically required to react with the acid to form a neutral salt, subdividing said hardened plastic mass, leaching said subdivided product with a water-miscible solvent in which said toxic phenolic components are soluble but in which said salt is substantially insoluble, to form a single liquid-phase comprising said toxic phenolic components, said water of reaction and said solvent and to separate said toxic phenolic components from said salt, treating such leached product with an acid capable of displacing the acid from the alkaline earth metal salt, and separating the liberated acid from the reaction mixture.

8. The process of claim 7 wherein the liquid treated is a cashew nut shell liquid containing at least 40% of anacardic acid; wherein the alkaline metal compound is slaked lime and is employed in excess of that theoretically required to react with the acid to form a basic salt; and wherein the acid capable of displacing the acid from the alkaline earth metal salt is an acid which forms an insoluble salt with the alkaline earth metal.

9. The process for the separation of the acid constituent contained in a liquid selected from the group consisting of cashew nut shell liquid and hydrogenated cashew nut shell liquid from toxic phenolic components of said liquid which comprises converting acid contained in said liquid into a water-soluble salt and reacting said water-soluble salt with a water-soluble alkaline earth metal salt to form a solid alkaline earth metal salt of said acid with which water of reaction and toxic phenolic components of said liquid are associated, said reaction being conducted in a water-miscible solvent in which said toxic phenolic components are soluble but in which said solid salt is substantially insoluble to form said solid alkaline earth metal salt as a finely divided precipitate in a single liquid-phase comprising said toxic phenolic components, said water of reaction and said solvent, separating said liquid-phase from said solid salt, treating said separated salt with an acid capable of displacing the acid from said salt, and separating the liberated acid from the reaction mixture.

10. The process of claim 9 wherein the alkaline earth metal salt is present in excess of that theoretically required to form the basic salt.

11. The process of claim 9 wherein the liquid treated is a cashew nut shell liquid containing at least 40% of anacardic acid; wherein the water-soluble alkaline earth metal salt is a calcium salt and is present in excess of that theoretically required to form the basic salt of the acid; and wherein the acid capable of displacing the acid from the alkaline earth metal salt is an acid which forms an insoluble salt with the alkaline earth metal.

ROLAND E. KREMERS.

REFERENCES CITED

The following references are of record in the file of this patent:

UNITED STATES PATENTS

| Number | Name | Date |
| --- | --- | --- |
| 2,230,995 | Balvalli | Feb. 11, 1941 |
| 1,838,075 | Harvey | Dec. 22, 1931 |
| 2,000,244 | Merrill | May 7, 1935 |
| 2,170,506 | Reiber | Aug. 22, 1939 |
| 2,132,356 | Lecher | Oct. 4, 1938 |
| 2,198,292 | Reiff et al. | Apr. 23, 1940 |
| 2,252,664 | Reiff et al. | Aug. 12, 1941 |